United States Patent
Han

(10) Patent No.: US 11,372,533 B2
(45) Date of Patent: Jun. 28, 2022

(54) DISPLAY METHOD AND DISPLAY DEVICE IN PORTABLE TERMINAL

(71) Applicant: Samsung Electronics Co., Ltd., Suwon-si (KR)

(72) Inventor: Liang Han, Tianjin (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/759,918

(22) PCT Filed: Nov. 9, 2018

(86) PCT No.: PCT/KR2018/013647
§ 371 (c)(1),
(2) Date: Apr. 28, 2020

(87) PCT Pub. No.: WO2020/096096
PCT Pub. Date: May 14, 2020

(65) Prior Publication Data
US 2021/0247884 A1 Aug. 12, 2021

(51) Int. Cl.
*G06F 3/0485* (2022.01)
*G06F 3/0346* (2013.01)

(52) U.S. Cl.
CPC .......... *G06F 3/0485* (2013.01); *G06F 3/0346* (2013.01)

(58) Field of Classification Search
CPC .. G06F 3/0485; G06F 3/0346; G06F 3/04845; G06F 1/1694; G06F 3/038; G06F 3/0488
USPC ....................................................... 345/156
See application file for complete search history.

(56) References Cited

U.S. PATENT DOCUMENTS

| | | | |
|---|---|---|---|
| 8,717,283 B1 | 5/2014 | Lundy et al. | |
| 8,717,285 B1 * | 5/2014 | White | G06F 3/0346 345/156 |
| 9,077,884 B2 * | 7/2015 | House | H04M 1/72403 |
| 2002/0191029 A1 * | 12/2002 | Gillespie | G06F 3/04817 715/810 |
| 2004/0169674 A1 * | 9/2004 | Linjama | G06F 1/1626 715/702 |

(Continued)

FOREIGN PATENT DOCUMENTS

WO 2011/056209 A1 5/2011

OTHER PUBLICATIONS

International Search Report dated Nov. 9, 2018, issued in International Patent Application No. PCT/KR2018/013647.

*Primary Examiner* — Bryan Earles
(74) *Attorney, Agent, or Firm* — Jefferson IP Law, LLP

(57) ABSTRACT

There are provided a display method and a display device in a portable terminal, the display method including: in a predetermined display mode, detecting a first motion vector of the portable terminal; calculating a second motion vector of a page currently displayed on a screen of the portable terminal based on the first motion vector of the portable terminal; and controlling the page to move on the screen according to the calculated second motion vector. By adopting the display method and the display device in the portable terminal according to the exemplary embodiment of the present disclosure, a page displayed on a screen of the portable terminal may be controlled to move through a motion sensing operation, thereby avoiding a touch operation for the screen during controlling the page to move.

16 Claims, 5 Drawing Sheets

(56) References Cited

U.S. PATENT DOCUMENTS

| | | | |
|---|---|---|---|
| 2006/0164382 A1 | 7/2006 | Kulas et al. | |
| 2010/0174421 A1 | 7/2010 | Tsai et al. | |
| 2012/0038675 A1* | 2/2012 | Johnson | G06F 1/1694 |
| | | | 345/660 |
| 2012/0167003 A1* | 6/2012 | Johansson | G06F 3/04883 |
| | | | 715/786 |
| 2013/0232443 A1* | 9/2013 | Ryu | G06F 3/0485 |
| | | | 715/784 |
| 2017/0228359 A1* | 8/2017 | Cuzzort | G06F 3/1454 |
| 2017/0315594 A1 | 11/2017 | Vaananen et al. | |
| 2017/0322706 A1* | 11/2017 | Ochiai | G06F 3/0483 |

* cited by examiner

[Fig. 1]
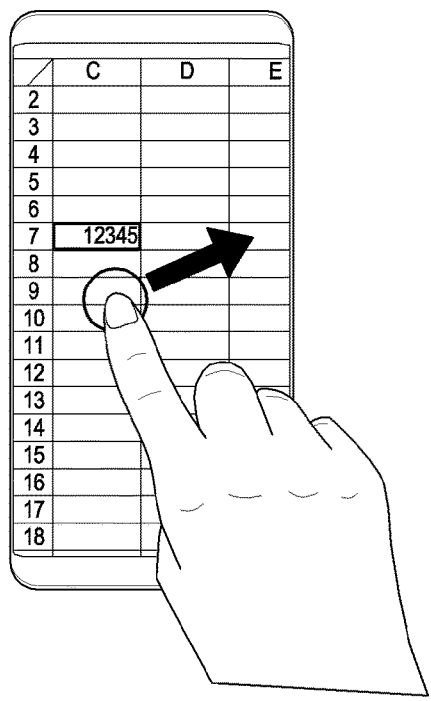
[Fig. 2]
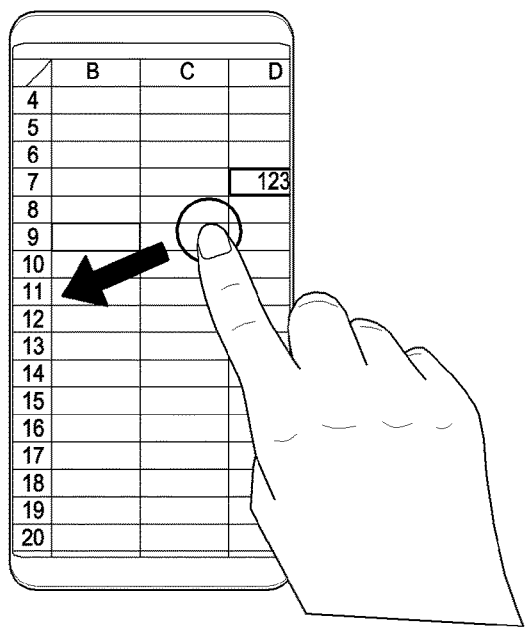

[Fig. 3]
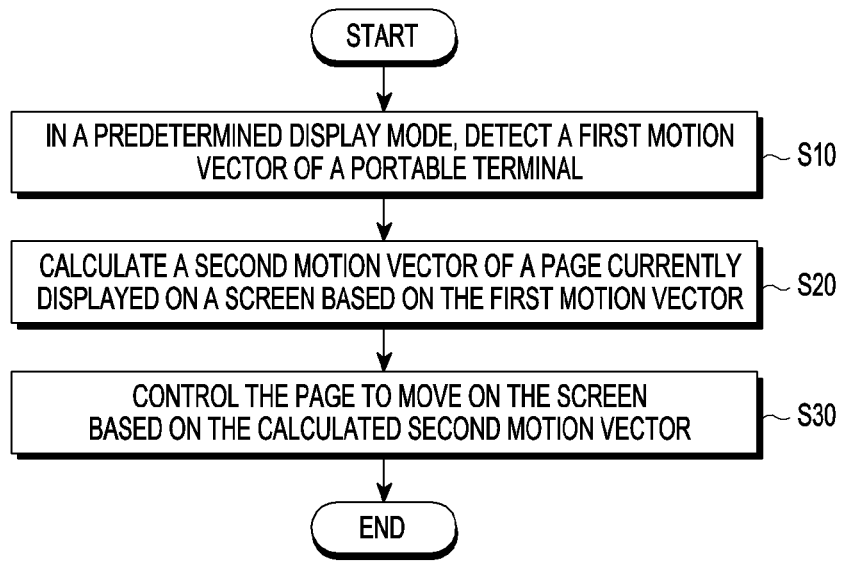
[Fig. 4]
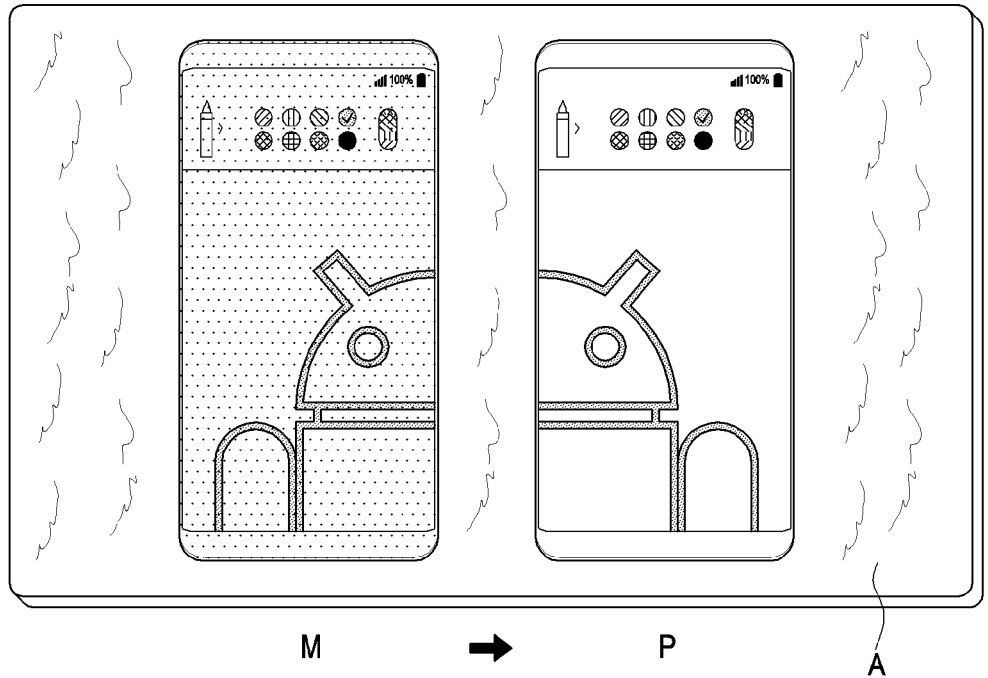

[Fig. 5]
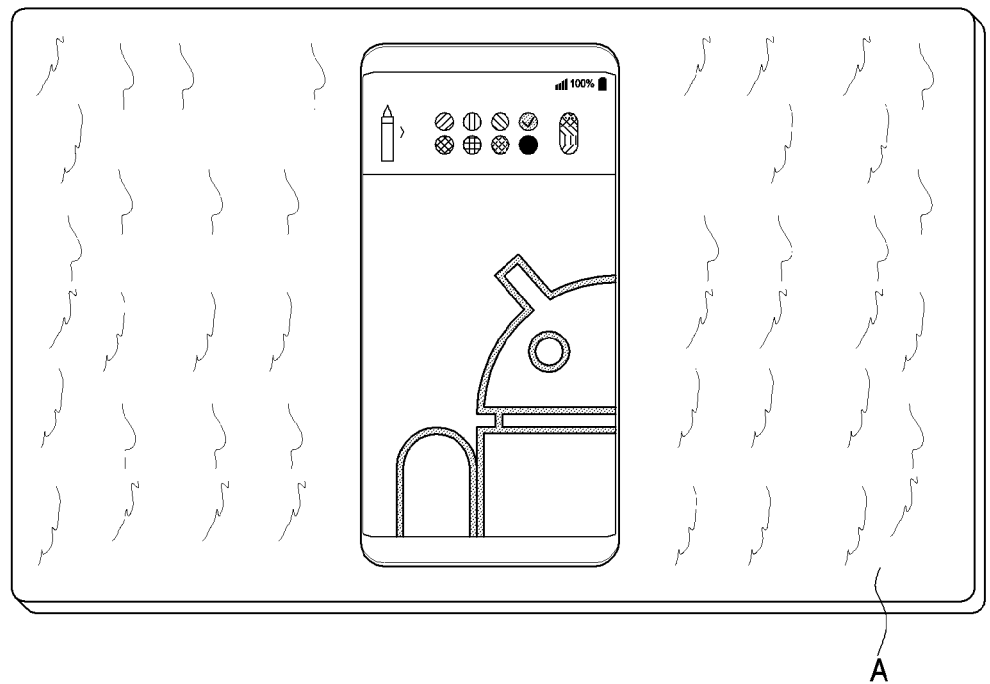
[Fig. 6]
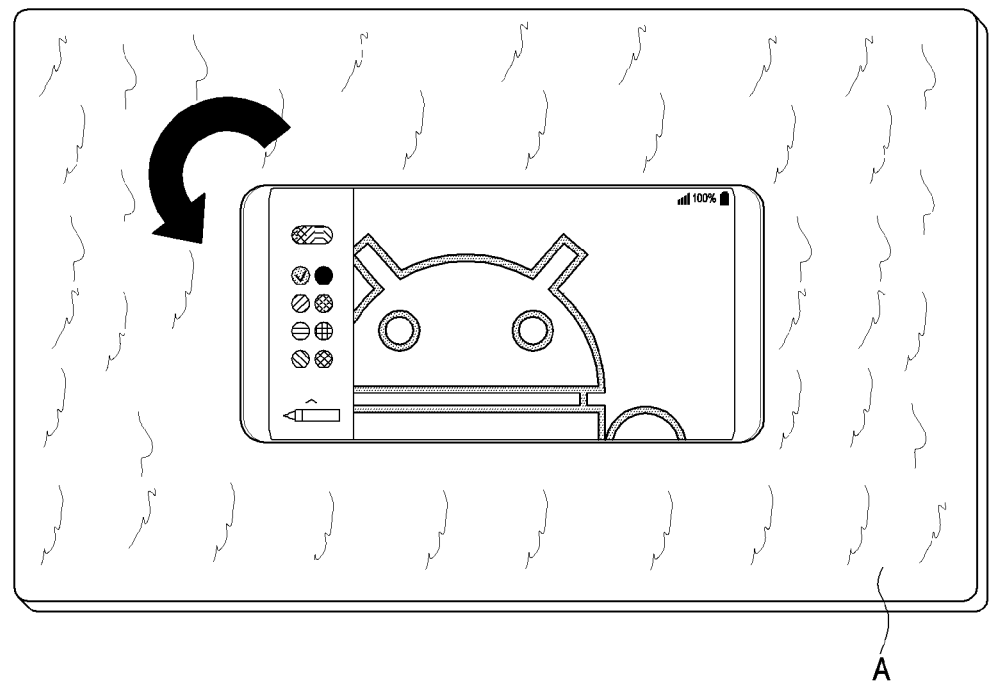

[Fig. 7]
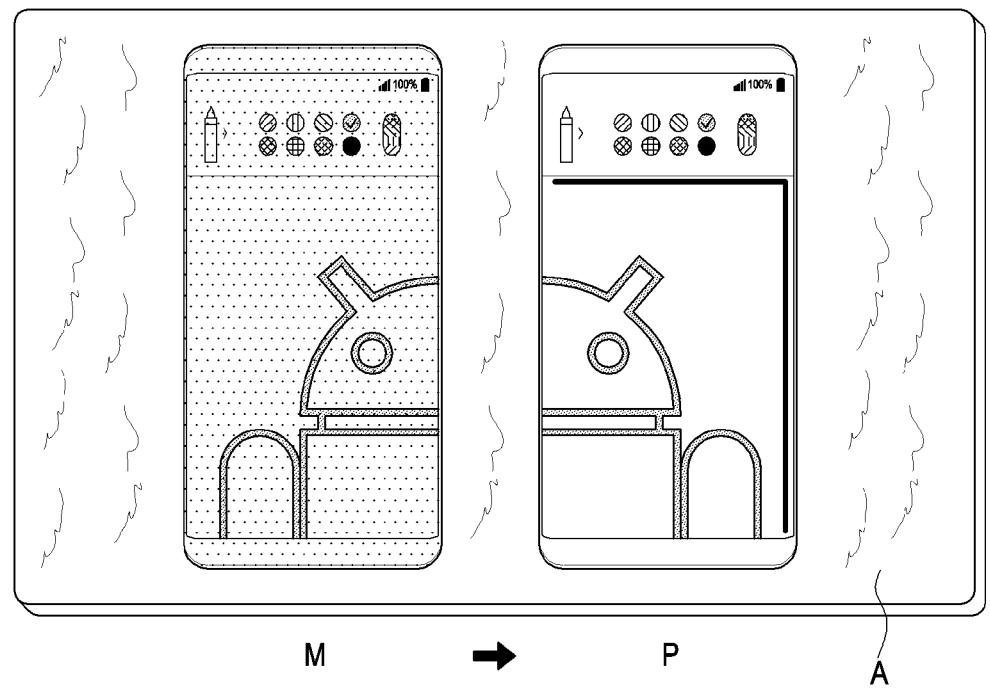
[Fig. 8]
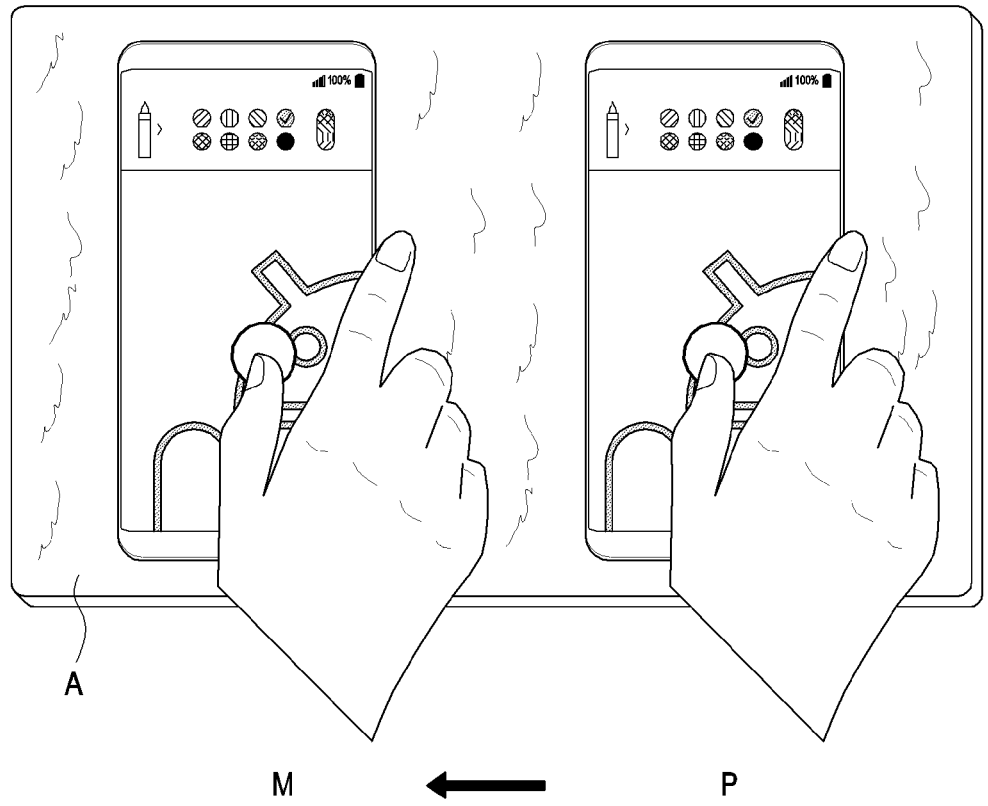

[Fig. 9]
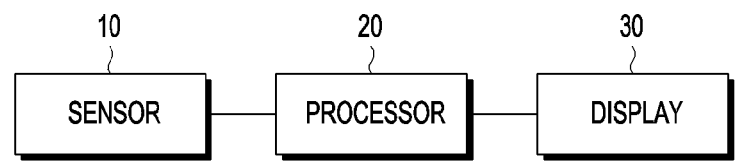

DISPLAY METHOD AND DISPLAY DEVICE IN PORTABLE TERMINAL

CROSS-REFERENCE TO RELATED APPLICATION(S)

This application is a National Phase Entry of PCT International application number PCT/KR2018/013647, which was filed on Nov. 9, 2018, the disclosure of which is incorporated herein by reference herein in its entirety.

TECHNICAL FIELD

The present disclosure relates to an electronic technical field, and more particularly, relates to a display method and a display device in a portable terminal.

BACKGROUND ART

At present, during performing view/edit operations on a text document or a drawing in a portable terminal, it usually needs to enlarge a page of the viewed/edited text document or drawing due to a limit of a screen size of the portable terminal. In this case, a partial page is outside a display area of a screen; at this time, when a user wants to view/edit the page outside the display area of the screen, a movement of the page is generally controlled according to a slide operation on the screen by a user's finger (as shown in FIGS. 1 and 2).

The above manner of controlling the page to move according to the slide operation on the screen by the user's finger, on one hand, requires that the user's finger cannot leave the screen after pressing, which changes a location of a cursor very easily, or causes an error operation; on the other hand, such an operation will cause a shield for the display area and affect the user watching contents of the page within the display area during the moving.

DISCLOSURE OF INVENTION

Technical Problem

A purpose of an exemplary embodiment of the present disclosure is to provide a display method and a display device in a portable terminal. A page displayed on a screen of the portable terminal may be controlled to move through a motion sensing operation, an error operation during moving the page is effectively avoided, and contents of a page displayed on the screen are not shielded during moving the page.

Solution to Problem

According to one aspect of the exemplary embodiment of the present disclosure, there is provided a display method in a portable terminal, including: in a predetermined display mode, detecting a first motion vector of the portable terminal; calculating a second motion vector of a page currently displayed on a screen of the portable terminal based on the first motion vector of the portable terminal; and controlling the page to move on the screen according to the calculated second motion vector.

Alternately, the display method may further include: when the portable terminal is in a predetermined state, controlling the portable terminal to enter the predetermined display mode.

Alternately, the predetermined state may include the portable terminal not being translated in a predetermined direction.

Alternately, the predetermined direction may be a gravity direction.

Alternately, the controlling of the portable terminal to enter the predetermined display mode may include: when the portable terminal is in the predetermined state, and if a prepositive distance sensor detects that a distance between an object located in front of the portable terminal and the portable terminal is smaller than a predetermined value and/or that the page is a predetermined page, controlling the portable terminal to enter the predetermined display mode.

Alternately, the predetermined page may include a page for editing and/or browsing.

Alternately, a direction of the second motion vector may be opposite to a direction of the first motion vector.

Alternately, the first motion vector and the second motion vector may both include a moving vector, the moving vector may include a moving distance in an X axis direction and a moving distance in a Y axis direction, and the X axis and Y axis may be axes perpendicular to each other on a plane of the screen of the portable terminal, wherein the controlling of the page to move on the screen according to the calculated second motion vector may include: controlling the page to move in the X axis direction and/or in the Y axis direction according to the moving vector included in the second motion vector.

Alternately, the calculating of the second motion vector of the page based on the first motion vector of the portable terminal may include: obtaining the second motion vector according to a product of the first motion vector and a predetermined displacement coefficient.

Alternately, the first motion vector and the second motion vector may both further include a rotating vector, the rotating vector may include an rotating angle around a Z axis, the Z axis may be an axis perpendicular to a plane of the screen of the portable terminal, and the predetermined direction is a direction of the Z axis, wherein the controlling of the page to move on the screen according to the calculated second motion vector may further include: controlling the page to rotate around the Z axis according to the rotating vector included in the second motion vector.

Alternately, the portable terminal not being translated in the predetermined direction indicates that a translation amount of the portable terminal in the predetermined direction is within a set range, and the rotating vector may further include a rotating angle around the X axis and a rotating angle around the Y axis, wherein the display method may further include: when the translation amount of the portable terminal in the predetermined direction is within the set range, and if the rotating angle around the X axis included in the first motion vector is smaller than a first predetermined rotating angle and the rotating angle around the Y axis is smaller than a second predetermined rotating angle, controlling the portable terminal to perform corresponding operations.

Alternately, the corresponding operation may include displaying a menu associated with the page.

Alternately, the display method may further include: when the portable terminal is not in the predetermined state, controlling the portable terminal to exit from the predetermined display mode.

Alternately, the display method may further include: when the page is moved to an edge of the page to be coincided with a boundary of the screen, prompting the user using a predetermined manner.

Alternately, the predetermined manner may include at least one of: displaying prompt information, voice prompting and highlighting the edge of the page coincided with the boundary of the screen.

Alternately, the display method may further include: detecting a predetermined operation performed on the screen; in response to the predetermined operation, locking the page, wherein, when the page is in a locked state, not detecting the first motion vector of the portable terminal or not controlling the page to move on the screen according to the second motion vector.

According to another aspect of the exemplary embodiment of the present disclosure, there is provided a display device in a portable terminal, including: a sensor; a processor, configured to: in a predetermined display mode, detect a first motion vector of the portable terminal via the sensor, and calculate a second motion vector of a page currently displayed on a screen of the portable terminal based on the first motion vector of the portable terminal; and a display, under control of the processor, to control the page to move on the screen according to the calculated second motion vector.

Alternately, the processor may further be configured to: when the portable terminal is in a predetermined state, control the portable terminal to enter a predetermined display mode.

Alternately, the predetermined state may include the portable terminal not being translated in a predetermined direction.

Alternately, the predetermined direction may be a gravity direction.

Alternately, the controlling of the portable terminal to enter the predetermined display mode may include: when the portable terminal is in the predetermined state, and if a prepositive distance sensor detects that a distance between an object located in front of the portable terminal and the portable terminal is smaller than a predetermined value and/or that the page is a predetermined page, the processor controls the portable terminal to enter the predetermined display mode.

Alternately, the predetermined page may include a page for editing and/or browsing.

Alternately, a direction of the second motion vector may be opposite to a direction of the first motion vector.

Alternately, the first motion vector and the second motion vector may both include a moving vector, the moving vector may include a moving distance in an X axis direction and a moving distance in a Y axis direction, and the X axis and Y axis may be axes perpendicular to each other on a plane of the screen of the portable terminal, wherein the processor may control the display to control the page to move in the X axis direction and/or in the Y axis direction according to the moving vector included in the second motion vector.

Alternately, the calculating of the second motion vector of the page based on the first motion vector of the portable terminal may include: obtaining the second motion vector according to a product of the first motion vector and a predetermined displacement coefficient.

Alternately, the first motion vector and the second motion vector may both further include a rotating vector, the rotating vector may include an rotating angle around a Z axis, the Z axis may be an axis perpendicular to the plane of the screen of the portable terminal, and the predetermined direction is a direction of the Z axis, wherein the processor may further control the display to control the page to rotate around the Z axis according to the rotating vector included in the second motion vector.

Alternately, the portable terminal not being translated in the predetermined direction indicates that a translation amount of the portable terminal in the predetermined direction is within a set range, and the rotating vector may further include a rotating angle around the X axis and a rotating angle around the Y axis, wherein, when the translation amount of the portable terminal in the predetermined direction is within the set range, and if the rotating angle around the X axis included in the first motion vector is smaller than a first predetermined rotating angle and the rotating angle around the Y axis is smaller than a second predetermined rotating angle, the processor may control the portable terminal to perform corresponding operations.

Alternately, the corresponding operation may include displaying a menu associated with the page.

Alternately, the processor may further be configured to: when the portable terminal is not in the predetermined state, control the portable terminal to exit from the predetermined display mode.

Alternately, when the page is moved to an edge of the page to be coincided with a boundary of the screen, the processor may control the display to prompt the user using a predetermined manner.

Alternately, the predetermined manner may include at least one of: displaying prompt information, voice prompting and highlighting the edge of the page coincided with the boundary of the screen.

Alternately, the display device may further include: an input interface, wherein the processor is further configured to: detect the predetermined operation performed on the screen via the input interface, and in response to the predetermined operation, lock the page, wherein, when the page is in a locked state, the processor controls the sensor not to detect the first motion vector of the portable terminal or the processor controls the display not to control the page to move on the screen according to the second motion vector.

According to further aspect of the exemplary embodiment of the present disclosure, there is provided a computer readable storage medium storing a program instruction, when executed by a processor, to cause the processor to perform the above display method in the portable terminal.

By adopting the display method and the display device in the portable terminal according to the exemplary embodiment of the present disclosure, a page displayed on a screen of the portable terminal may be controlled to move through a motion sensing operation.

BRIEF DESCRIPTION OF DRAWINGS

The above and other purposes, features and advantages of exemplary embodiments of the present invention will become apparent from the following detailed description, taken in conjunction with the following illustrated drawings of the embodiment in which:

FIG. 1 and FIG. 2 show schematic diagrams of controlling a page to move through touch and slide operations on a screen in the related art;

FIG. 3 shows a flowchart of a display method in a portable terminal according to an exemplary embodiment of the present disclosure;

FIG. 4 shows a schematic diagram of controlling a page to move in an X axis direction and/or a Y axis direction according to an exemplary embodiment of the present disclosure;

FIG. 5 and FIG. 6 show schematic diagrams of controlling a page to rotate around a Z axis according to an exemplary embodiment of the present disclosure;

FIG. 7 shows a schematic diagram of prompting a user using a predetermined manner when an edge of a page is coincided with a boundary of a screen according to an exemplary embodiment of the present disclosure;

FIG. 8 shows a schematic diagram of locking a page according to an exemplary embodiment of the present disclosure; and FIG. 9 shows a structure diagram of a display device in the portable terminal according to an exemplary embodiment of the present disclosure.

MODE FOR THE INVENTION

Here, the different exemplary embodiments will be described more sufficiently with reference to the drawings, wherein some exemplary embodiments will be illustrated in the drawings.

FIG. 3 shows a flowchart of a display method in a portable terminal according to an exemplary embodiment of the present disclosure. As an example, the portable terminal may be an electronic device having a display screen and having motion sensing functions, such as a smart phone, a tablet computer, a personal digital assistant, a game machine, a multimedia player and the like.

Referring to FIG. 3, in a step S10, in a predetermined display mode, a first motion vector of the portable terminal is detected. It should be understood that here the portable terminal is made to generate the first motion vector based on moving the portable terminal by a user, and it does not need the user to touch a screen of the portable terminal.

Preferably, the display method in the portable terminal according to the exemplary embodiment of the present disclosure may further include: controlling the portable terminal to enter a predetermined display mode. For example, the portable terminal may be controlled to enter the predetermined display mode in a manual/automatic manner. Two cases of controlling the portable terminal to enter the predetermined display mode in the automatic manner are introduced below.

One case is, when the portable terminal is in a predetermined state, the portable terminal is controlled to enter the predetermined display mode. Preferably, when the portable terminal is in the predetermined state and maintains for a predetermined time, the portable terminal is controlled to enter the predetermined display mode.

Here, the predetermined state may include the portable terminal not being translated in a predetermined direction. For example, when the portable terminal is not translated in a gravity direction, the portable terminal may be controlled to enter the predetermined display mode.

Here, the portable terminal not being translated in the predetermined direction may be understood as the portable terminal being flatly placed on a predetermined plane perpendicular to the predetermined direction. At this time, a screen of the portable terminal is parallel to the predetermined plane. For example, when the portable terminal is flatly placed on a horizontal plane, the predetermined direction is the gravity direction. It should be understood that, based on the predetermined plane on which the portable terminal is flatly placed, the predetermined direction may be any direction perpendicular to the predetermined plane.

The other case is, when the portable terminal is in the predetermined state, and if a prepositive distance sensor of the portable terminal detects that a distance between an object located in front of the portable terminal and the portable terminal is smaller than a predetermined value and/or that the page is a predetermined page, the portable terminal is controlled to enter the predetermined display mode. Preferably, on the basis that the page is a predetermined page, and when the page is in an enlarged state (that is, an area of the page is larger than an area of the screen), the portable terminal is controlled to enter the predetermined display mode.

As an example, the predetermined page may include a page for editing and/or browsing. For example, a web browsing page, a picture browsing page, a drawing browsing page, a document (text, table and the like) editing page, an image editing page, etc.

Preferably, when the portable terminal is not in the predetermined state, the portable terminal may be controlled to exit from the predetermined display mode. For example, when the portable terminal is translated in the predetermined direction, the portable terminal is controlled to exit from the predetermined display mode. As an example, when the portable terminal is picked up from the predetermined plane, the predetermined display mode is closed automatically.

As an example, the first motion vector of the portable terminal may be detected through a sensor disposed in the portable terminal. The first motion vector may include a moving vector and/or a rotating vector, that is, a moving vector of the portable terminal along an X axis, a Y axis and a Z axis perpendicular to each other and/or a rotating vector around the three axes. Here, the X axis and Y axis are axes perpendicular to each other on a plane of the screen of the portable terminal, and the Z axis is an axis perpendicular to the plane of a display screen. At this time, the predetermined direction is consistent with a Z axis direction.

In this case, the sensor disposed in the portable terminal may include an acceleration sensor, a gyroscope and/or a geomagnetic sensor.

Here, the acceleration sensor may determine the moving vector of the portable terminal by sensing an acceleration of the portable terminal, that is, a moving speed and/or a moving distance of the portable terminal along the three axes is obtained by sensing a moving acceleration of the portable terminal along the X axis, Y axis and Z axis. Thus, the acceleration sensor may be a multi-axis (e.g., three axes or two axes, but not limited hereto) acceleration sensor or an acceleration sensor constituted by a plurality of (e.g., three or two, but not limited hereto) accelerometers.

The gyroscope and the geomagnetic sensor may be used to determine a posture of the portable terminal. Specifically speaking, the gyroscope may determine the posture of the portable terminal by sensing a rotating acceleration of the portable terminal rotated around the X axis, Y axis and Z axis, that is, a rotation speed and/or a rotating angle around the three axes. Thus, the gyroscope may be a multi-axis (e.g., three axes or two axes, but not limited hereto) gyroscope or a gyroscope group constituted by a plurality of (e.g., three or two, but not limited hereto) gyroscope meters. The geomagnetic sensor determines the posture of the portable terminal by sensing a geomagnetic direction. For example, when sensing that the portable terminal is not translated in the gravity direction through the geomagnetic sensor, the portable terminal is controlled to enter the predetermined display mode.

It should be understood that the detected first motion vector of the portable terminal is (includes) the moving vector of the portable terminal along the X axis, Y axis and Z axis perpendicular to each other and/or the rotating vector around the three axes sensed on the premise that the portable terminal is maintained in the predetermined direction without being translated. That is to say, when the portable terminal is in the predetermined display mode, the portable terminal is maintained in the predetermined direction without being translated. When the portable terminal is translated in the predetermined direction, the portable terminal is controlled to exit from the predetermined display mode.

Besides this, preferably, when the portable terminal is moved in a constant speed, an image acquired by a camera of the portable terminal may be used to determine the first motion vector of the portable terminal.

For example, images before and after a predetermined action may be acquired through the camera of the portable terminal; here, the predetermined action may be an action for controlling the terminal to move to generate the first motion vector, and the first motion vector is determined based on the acquired image. It should be understood that a method of determining the motion vector of the portable terminal based on the acquired image is a common knowledge in the art, and the present disclosure will not describe this part of content any longer. An accuracy of detecting the first motion vector may be improved by combining the image acquired through the camera and data collected by the above respective sensors.

In a step S20, a second motion vector of a page currently displayed on a screen of the portable terminal is calculated based on the first motion vector of the portable terminal. For example, a direction of the second motion vector is opposite to a direction of the first motion vector.

Here, the second motion vector may include the moving vector and/or the rotating vector, that is, the moving vector (may include at least one of the moving acceleration, the moving speed and the moving distance) of the page along the above X axis, Y axis and Z axis direction and the rotating vector (may include at least one of the rotating acceleration, the rotating speed and the rotating angle) of the page around the above X axis, Y axis and Z axis.

As an example, the second motion vector of the page currently displayed on the screen of the portable terminal may be calculated by only considering the moving vector (e.g., the moving distance) of the portable terminal in the X axis and Y axis directions and the rotating vector (e.g., the rotating angle) of the portable terminal around the Z axis. At this time, the second motion vector of the page will include the moving distance of the page along the X axis and the Y axis and the rotating angle around the Z axis.

Preferably, the second motion vector may be obtained according to a product of the first motion vector and a predetermined displacement coefficient. Here, the predetermined displacement coefficient may be set according to an experience value, and may further be adjusted based on a user's operation.

In a step S30, the page is controlled to move on the screen according to the calculated second motion vector.

Regarding the case that the first motion vector and the second motion vector both include the moving vector, the page may be controlled to move in the X axis direction and/or in the Y axis direction according to the moving vector included in the second motion vector. For example, the page is controlled to move by the moving distance in the X axis direction and/or in the Y axis direction included in the second motion vector along the X axis and/or the Y axis.

FIG. 4 shows a schematic diagram of controlling a page to move in an X axis direction and/or a Y axis direction according to an exemplary embodiment of the present disclosure.

As shown in FIG. 4, in the example, it is supposed that the portable terminal is flatly placed on a location M of a predetermined table (i.e., a horizontal table A), at this time the portable terminal is not translated in the gravity direction, that is, the portable terminal is in a predetermined state, and when the page currently displayed on the screen of the portable terminal is a page for viewing/editing an image, the portable terminal is in the predetermined display mode. In this case, when the portable terminal is moved to a location P from the location M on the horizontal table A, the first motion vector (the moving vector in the X axis direction and/or in the Y axis direction) of the portable terminal on the horizontal table A is detected, the second motion vector of the page currently displayed on the screen is calculated, and the page is controlled to move in the X axis direction and/or in the Y axis direction according to the second motion vector.

It should be understood that the page currently displayed on the screen of the portable terminal is a page including all contents of the page, and an area of the page may be larger than, equal to or smaller than an area of the screen of the portable terminal. When the area of the page is larger than the area of the screen, the page currently displayed on the screen does not refer to only a partial page that is displayed on the screen. For example, taking FIG. 4 as an example, the page currently displayed on the screen should be a complete page for viewing/editing the image in FIG. 4, and include a part that is displayed and a part that is not displayed on the screen.

Here, since the portable terminal is moved on the horizontal table A, the portable terminal is maintained in the predetermined direction without being translated in a process of controlling an action for the portable terminal, so that the action for the portable terminal by the user is more easily controlled, and the first motion vector of the portable terminal may further be detected more accurately.

Regarding the case that the first motion vector and the second motion vector both further include the rotating angle around the Z axis, the page may be controlled to rotate around the Z axis according to the rotating vector included in the second motion vector. For example, the page is controlled to rotate around the Z axis by the rotating angle rotated around the Z axis included in the second motion vector.

FIG. 5 and FIG. 6 show schematic diagrams of controlling a page to rotate around a Z axis according to an exemplary embodiment of the present disclosure.

As shown in FIG. 5, in the example, it is supposed that the portable terminal is flatly placed on the horizontal table A, at this time the portable terminal is not translated in the gravity direction, that is, the portable terminal is in a predetermined state, and when the page currently displayed on the screen of the portable terminal is a page for viewing/editing an image, the portable terminal is in the predetermined display mode. In this case, when the first motion vector (the rotating vector around the Z axis) of the portable terminal on the horizontal table A is detected, the second motion vector of the page currently displayed on the screen is calculated, and the page is controlled to move around the Z axis according to the second motion vector (as shown in FIG. 6).

Preferably, the display method in the portable terminal according to the exemplary embodiment of the present disclosure may further include: when the page currently displayed on the screen is moved to an edge of the page to be coincided with a boundary of the screen, prompting the user using a predetermined manner. As an example, the predetermined manner may include at least one of: displaying prompt information, voice prompting and highlighting the edge of the page coincided with the boundary of the screen.

FIG. 7 shows a schematic diagram of prompting a user using a predetermined manner when an edge of a page is coincided with a boundary of a screen according to an exemplary embodiment of the present disclosure.

As shown in FIG. 7, for example, when the portable terminal is moved to the location P from the location M on the horizontal table A, and if the edge of the page is coincided with the boundary of the screen, the page may be controlled not to move according to the second motion vector (i.e., the page is controlled not to move toward the boundary of the screen), and the edge of the page (e.g., an upper edge and a right edge of the page) coincided with the boundary of the screen is highlighted, to prompt the user that the page cannot be moved.

In addition, preferably, the display method in the portable terminal according to the exemplary embodiment of the present disclosure may further include: detecting a predetermined operation perform on the screen; in response to the predetermined operation, locking the page; and when the page is in a locked state, not detecting the first motion vector of the portable terminal or not controlling the page to move on the screen according to the second motion vector.

FIG. 8 shows a schematic diagram of locking a page according to an exemplary embodiment of the present disclosure.

As shown in FIG. 8, when the portable terminal has been moved to the edge of the horizontal table A (such as the location P on the horizontal table A), as for the case that it still needs to move to the edge of the horizontal table A, if the predetermined operation performed on the screen is detected, for example, the predetermined operation may include a touch operation, the page currently displayed on the screen is locked during continuing the predetermined operation; at this time, the first motion vector of the portable terminal is not detected or the page is controlled not to move according to the second motion vector, that is, when the portable terminal is moved on the horizontal table A (e.g., moved to the location M from the location P on the horizontal table A), the page currently displayed on the screen is not moved. The user may adjust a direction and a location of the portable terminal on the horizontal table A through the above manner for the subsequent operation. When the predetermined operation ends (e.g., a user's finger leaves the screen), a lock for the page is canceled.

It should be understood that, in the display method in the portable terminal in the exemplary embodiment of the present disclosure, besides the page may be controlled to move according to the first motion vector of the portable terminal, the terminal may further be controlled to perform corresponding operations according to the first motion vector of the portable terminal. Preferably, when the portable terminal is in the predetermined display mode, the portable terminal is controlled not to enter the locked state, so as to facilitate controlling the terminal to perform the corresponding operations according to the first motion vector of the portable terminal.

It should be understood that, in one exemplary embodiment of the present disclosure, the portable terminal being not translated in the predetermined direction may refer to that a translation amount of the portable terminal in the predetermined direction is zero. However, the present disclosure is not limited hereto, the portable terminal being not translated in the predetermined direction may further refer to that the translation amount of the portable terminal in the predetermined direction is within a set range.

In this case, the display method in the portable terminal according to the exemplary embodiment of the present disclosure may further include: when the translation amount of the portable terminal in the predetermined direction (i.e., the Z axis) is within the set range, and if the rotating angle around the X axis included in the first motion vector is smaller than a first predetermined rotating angle and the rotating angle around the Y axis is smaller than a second predetermined rotating angle, controlling the terminal to perform corresponding operations. As an example, the corresponding operation may include displaying a menu associated with the page. For example, it may be controlled to display a tool bar, a menu bar, a shortcut window and the like corresponding to the page on the screen of the portable terminal.

FIG. 9 shows a structure diagram of a display device in the portable terminal according to an exemplary embodiment of the present disclosure. As an example, the portable terminal may be an electronic device having a display screen and having motion sensing functions, such as a smart phone, a tablet computer, a personal digital assistant, a game machine, a multimedia player and the like.

As shown in FIG. 9, the display device in the portable terminal according to the exemplary embodiment of the present disclosure includes a sensor 10, a processor 20 and a display 30.

Specifically speaking, the processor 20 is configured to, in a predetermined display mode, detect a first motion vector of the portable terminal by the sensor 10. It should be understood that here the portable terminal is made to generate the first motion vector based on moving the portable terminal by a user, and it does not need the user to touch a screen of the portable terminal.

Preferably, the processor 20 may further be configured to: control the portable terminal to enter a predetermined display mode. For example, the processor 20 may control the portable terminal to enter the predetermined display mode in a manual/automatic manner. Two cases of controlling the portable terminal to enter the predetermined display mode by the processor 20 in the automatic manner are introduced below.

One case is, when the portable terminal is in a predetermined state, the processor 20 controls the portable terminal to enter the predetermined display mode. Preferably, when the portable terminal is in the predetermined state and maintains for a predetermined time, the processor 20 controls the portable terminal to enter the predetermined display mode.

Here, the predetermined state may include the portable terminal not being translated in a predetermined direction. As an example, the predetermined direction may be a gravity direction. For example, when the portable terminal is not translated in the gravity direction, the processor 20 may control the portable terminal to enter the predetermined display mode.

Here, the portable terminal not being translated in the predetermined direction may be understood as the portable terminal being flatly placed on a predetermined plane perpendicular to the predetermined direction. At this time, a screen of the portable terminal is parallel to the predetermined plane. For example, when the portable terminal is flatly placed on a horizontal plane, the predetermined direction is the gravity direction. It should be understood that, based on the predetermined plane on which the portable terminal is flatly placed, the predetermined direction may be any direction perpendicular to the predetermined plane.

The other case, when the portable terminal is in the predetermined state, and if a prepositive distance sensor detects that a distance between an object located in front of the portable terminal and the portable terminal is smaller than a predetermined value and/or that the page is a predetermined page, the processor 20 controls the portable terminal to enter the predetermined display mode. Preferably, on the basis that the page is a predetermined page, and when the page is in an enlarged state (that is, an area of the page is larger than an area of the screen), the processor 20 controls the portable terminal to enter the predetermined display mode.

As an example, the predetermined page may include a page for editing and/or browsing. For example, a web browsing page, a picture browsing page, a drawing browsing page, a document (text, table and the like) editing page, an image editing page, etc.

Preferably, when the portable terminal is not in the predetermined state, the processor 20 controls the portable terminal to exit from the predetermined display mode. For example, when the portable terminal is translated in the predetermined direction, the processor 20 may control the portable terminal to exit from the predetermined display mode.

As an example, the first motion vector may include a moving vector and/or a rotating vector, that is, a moving vector of the portable terminal along an X axis, a Y axis and a Z axis perpendicular to each other and/or a rotating vector around the three axes. Here, the X axis and Y axis are axes perpendicular to each other on a plane of the screen of the portable terminal, and the Z axis is an axis perpendicular to the plane of a display screen. Preferably, the predetermined direction is consistent with the Z axis direction, and the X axis and Y axis are axes perpendicular to each other on the predetermined plane.

In this case, the sensor 10 may include an acceleration sensor, a gyroscope and/or a geomagnetic sensor.

Here, the acceleration sensor may determine the moving vector of the portable terminal by sensing an acceleration of the portable terminal, that is, a moving speed and/or a moving distance of the portable terminal along the three axes is obtained by sensing a moving acceleration of the portable terminal along the X axis, Y axis and Z axis. Thus, the acceleration sensor may be a multi-axis (e.g., three axes or two axes, but not limited hereto) acceleration sensor or an acceleration sensor constituted by a plurality of (e.g., three or two, but not limited hereto) accelerometers.

The gyroscope and the geomagnetic sensor may be used to determine a posture of the portable terminal. Specifically speaking, the gyroscope may determine the posture of the portable terminal by sensing a rotating acceleration of the portable terminal rotated around the X axis, Y axis and Z axis, that is, a rotation speed and/or a rotating angle of the portable terminal around the three axes. For this purpose, the gyroscope may be a multi-axis (e.g., three axes or two axes, but not limited hereto) gyroscope or a gyroscope group constituted by a plurality of (e.g., three or two, but not limited hereto) gyroscope meters. The geomagnetic sensor determines the posture of the portable terminal by sensing a geomagnetic direction. For example, when sensing that the portable terminal is not translated in the gravity direction through the geomagnetic sensor, the processor 20 controls the portable terminal to enter the predetermined display mode.

It should be understood that the first motion vector of the portable terminal detected by the sensor 10 is (includes) the moving vector of the portable terminal along the X axis, Y axis and Z axis perpendicular to each other and/or the rotating vector around the three axes sensed on the premise that the portable terminal is maintained in the predetermined direction without being translated. That is to say, when the portable terminal is in the predetermined display mode, the portable terminal is maintained in the predetermined direction without being translated.

The processor 20 is further configured to: calculate a second motion vector of a page currently displayed on a screen of the portable terminal based on the first motion vector of the portable terminal. For example, a direction of the second motion vector is opposite to a direction of the first motion vector.

Here, the second motion vector may include the moving vector and/or the rotating vector, that is, the moving vector (may include at least one of the moving acceleration, the moving speed and the moving distance) of the page along the above X axis, Y axis and Z axis direction and the rotating vector (may include at least one of the rotating acceleration, the rotating speed and the rotating angle) of the page around the above X axis, Y axis and Z axis.

As an example, the processor 20 may calculate the second motion vector of the page currently displayed on the screen of the portable terminal by only considering the moving vector (e.g., the moving distance) of the portable terminal in the X axis and Y axis directions and the rotating vector (e.g., the rotating angle) of the portable terminal around the Z axis. At this time, the second motion vector of the page will include the moving distance of the page along the X axis and the Y axis and the rotating angle around the Z axis.

Preferably, the processor 20 may obtain the second motion vector according to a product of the first motion vector and a predetermined displacement coefficient. Here, the predetermined displacement coefficient may be set according to an experience value, and may further be adjusted based on a user's operation.

The display 30, under control of the processor 20, controls the page to move on the screen according to the calculated second motion vector.

Regarding the case that the first motion vector and the second motion vector both include the moving vector, the processor 20 may control the display 30 to control the page to move in the X axis direction and/or in the Y axis direction according to the moving vector included in the second motion vector. For example, the processor 20 controls the display 30 to control the page to move by the moving distance in the X axis direction and/or in the Y axis direction included in the second motion vector along the X axis and/or the Y axis.

Regarding the case that the first motion vector and the second motion vector both include the rotating angle around the Z axis, the processor 20 may control the display 30 to control the page to rotate around the Z axis according to the rotating vector included in the second motion vector. For example, the processor 20 controls the display 30 to control the page to rotate around the Z axis by the rotating angle rotated around the Z axis included in the second motion vector.

Preferably, when the page currently displayed on the screen is moved to an edge of the page to be coincided with a boundary of the screen, the processor 20 may control the display 30 to prompt the user using a predetermined manner. As an example, the predetermined manner may include at least one of: displaying prompt information, voice prompting and highlighting the edge of the page coincided with the boundary of the screen.

In addition, preferably, the display device in the portable terminal according to the exemplary embodiment of the present disclosure may further include: an input interface through which the processor 20 detects the predetermined operation performed on the screen and locks the page in response to the predetermined operation. When the page is in a locked state, the processor 20 controls the sensor 10 not to detect the first motion vector of the portable terminal or controls the display 30 not to control the page to move on the screen according to the second motion vector.

It should be understood that, in the display device in the portable terminal in the exemplary embodiment of the present disclosure, besides the page may be controlled to move according to the first motion vector of the portable terminal, the processor 20 may further control the terminal to perform corresponding operations according to the first motion vector of the portable terminal. Preferably, when the portable terminal is in the predetermined display mode, the processor 20 controls the portable terminal not to enter the locked state, so as to facilitate controlling the terminal to perform the corresponding operations according to the first motion vector of the portable terminal.

It should be understood that, in the exemplary embodiment of the present disclosure, the portable terminal being not translated in the predetermined direction may refer to that a translation amount of the portable terminal in the predetermined direction is zero. However, the present disclosure is not limited hereto, the portable terminal being not translated in the predetermined direction may further refer to that the translation amount of the portable terminal in the predetermined direction is within a set range.

For example, when the translation amount of the portable terminal in the predetermined direction is within the set range, and if the rotating angle around the X axis included in the first motion vector is smaller than a first predetermined rotating angle and the rotating angle around the Y axis is smaller than a second predetermined rotating angle, the processor 20 controls the terminal to perform corresponding operations. As an example, the corresponding operation may include displaying a menu associated with the page. For example, the processor 20 may control to display a tool bar, a menu bar, a shortcut window and the like corresponding to the page on the screen of the portable terminal.

According to the exemplary embodiment of the present disclosure, there is further provided a computer readable storage medium. The computer readable storage medium is stored with a program instruction, when executed by a processor, to cause the processor to perform the above display method in the portable terminal. The computer readable recording medium is any data storage device that can store data which is read by a computer system. Examples of the computer readable recording medium include: a Read-Only Memory, a Random-Access Memory, a CD-Read Only Memory, a magnetic tape, a floppy disk, an optical data storage device and a carrier wave (such as a data transmission passing through a network via a wired or wireless transmission path). The computer readable recording medium may further be distributed in the computer system that is connected to the network, so that the computer readable codes are stored and executed in a distribution manner. In addition, completing function programs, codes and code segments of the present disclosure can be easily explained by ordinary programmers in the field related to the present disclosure within the range of the present disclosure.

By adopting the display method and the display device in the portable terminal according to the exemplary embodiment of the present disclosure, a page displayed on a screen of the portable terminal may be controlled to move through a motion sensing operation, to conform to a user's using habit better.

In addition, by adopting the display method and device in the portable terminal according to the exemplary embodiment of the present disclosure, the page is controlled to move through the motion sensing operation rather than a touch operation on the screen by the user, so that an error operation during controlling the page to move may be effectively prevented, and a shield for the displayed content of the page may further be avoided during controlling the page to move.

In addition, by adopting the display method and device in the portable terminal according to the exemplary embodiment of the present disclosure, the portable terminal is maintained in a predetermined direction without being translated during controlling the page to move, for example, when the portable terminal is flatly placed on a horizontal table, the portable terminal is not translated in a gravity direction when the user moves the portable terminal on the horizontal table, so that an action for moving the portable terminal on a horizontal table by the user is more easily controlled.

In addition, the display method in the portable terminal according to the exemplary embodiment of the present disclosure can be implemented to be a computer code of a computer readable recording medium. Those skilled in the art may implement the computer codes according to the description for the above method. When the computer codes are executed in a computer, the above method of the present disclosure is implemented.

Although the present disclosure has been particularly shown and described with reference to exemplary embodiments thereof, it will be understood by those skilled in the art that various changes in form and details may be made therein without departing from the spirit and scope of the present disclosure as defined by the following claims.

The invention claimed is:

1. A display method in a portable terminal, comprising:
   in a predetermined display mode, detecting a first motion vector of the portable terminal while a user is not touching a screen of the portable terminal;
   calculating a second motion vector of a page currently displayed on the screen of the portable terminal based on the first motion vector of the portable terminal;
   controlling the page to move on the screen according to the calculated second motion vector;
   when the page is moved to at least one edge of the page to be coincided with a boundary of the screen according to the calculated second motion vector without a touch operation on the screen, highlighting the at least one edge of the page, wherein the at least one edge of the page comprises one or two edges among four edges of the page;
   detecting a touch operation performed on the screen and locking the page during continuing of the touch operation; and
   in response to the locking of the page, not detecting the first motion vector of the portable terminal or controlling the page to not move on the screen according to the calculated second motion vector.

2. The display method of claim 1, further comprising:
   when the portable terminal is in a predetermined state, controlling the portable terminal to enter the predetermined display mode.

3. The display method of claim 2, wherein the predetermined state comprises the portable terminal not being translated in a predetermined direction.

4. The display method of claim 3, wherein the predetermined direction is a gravity direction.

5. The display method of claim 2, wherein the controlling of the portable terminal to enter the predetermined display mode comprises:

when the portable terminal is in the predetermined state, and if a prepositive distance sensor of the portable terminal detects that a distance between an object located in front of the portable terminal, and the portable terminal is smaller than a predetermined value and/or that the page is a predetermined page, controlling the portable terminal to enter the predetermined display mode.

6. The display method of claim 5, wherein the predetermined page comprises a page for editing and/or browsing.

7. The display method of claim 1, wherein a direction of the second motion vector is opposite to a direction of the first motion vector.

8. The display method of claim 1, wherein the first motion vector and the second motion vector both comprise a moving vector, the moving vector comprises a moving distance in an X axis direction and a moving distance in a Y axis direction, and the X axis and Y axis are axes perpendicular to each other on a plane of the screen of the portable terminal, wherein the controlling of the page to move on the screen according to the calculated second motion vector comprises:

controlling the page to move in the X axis direction and/or in the Y axis direction according to the moving vector included in the second motion vector.

9. A display device in a portable terminal, comprising:
a sensor;
a display; and
a processor configured to:

in a predetermined display mode, detect a first motion vector of the portable terminal via the sensor while a user is not touching a screen of the portable terminal, and calculate a second motion vector of a page currently displayed on the screen of the portable terminal based on the first motion vector of the portable terminal, control the page to move on the screen according to the calculated second motion vector, when the page is moved to at least one edge of the page to be coincided with a boundary of the screen according to the calculated second motion vector without a touch operation on the screen, highlighting the at least one edge of the page, wherein the at least one edge of the page comprises one or two edges among four edges of the page, detect a touch operation performed on the screen and lock the page during continuing of the touch operation, and in response to the locking of the page, not detect the first motion vector of the portable terminal or control the page to not move on the screen according to the calculated second motion vector.

10. The display device of claim 9, wherein the processor is further configured to, when the portable terminal is in a predetermined state, control the portable terminal to enter the predetermined display mode.

11. The display device of claim 10, wherein the predetermined state comprises the portable terminal not being translated in a predetermined direction.

12. The display device of claim 11, wherein the predetermined direction is a gravity direction.

13. The display device of claim 10, wherein the processor is further configured to:

when the portable terminal is in the predetermined state, and if a prepositive distance sensor of the portable terminal detects that a distance between an object located in front of the portable terminal and the portable terminal is smaller than a predetermined value and/or that the page is a predetermined page, control the portable terminal to enter the predetermined display mode.

14. The display device of claim 13, wherein the predetermined page comprises a page for editing and/or browsing.

15. The display device of claim 9, wherein a direction of the second motion vector is opposite to a direction of the first motion vector.

16. The display device of claim 9, wherein the first motion vector and the second motion vector both comprise a moving vector, the moving vector comprises a moving distance in an X axis direction and a moving distance in a Y axis direction, and the X axis and Y axis are axes perpendicular to each other on a plane of the screen of the portable terminal, and wherein the processor is further configured to control the page to move in the X axis direction and/or in the Y axis direction according to the moving vector included in the second motion vector.

* * * * *